(12) United States Patent
Lo

(10) Patent No.: US 6,318,428 B1
(45) Date of Patent: Nov. 20, 2001

(54) WHEEL RIM AND A SEAL MEMBER

(76) Inventor: Tsai Jen Lo, 215, Meei-Kong Road, Ta-Suen, Changhwa Hsien (TW)

( * ) Notice: Subject to any disclaimer, the term of this patent is extended or adjusted under 35 U.S.C. 154(b) by 0 days.

(21) Appl. No.: 09/534,078

(22) Filed: Mar. 24, 2000

(51) Int. Cl.$^7$ .......................... B60B 21/02; B60B 25/00; B60C 15/02; B60C 23/10
(52) U.S. Cl. .................................. 152/381.4; 152/381.3; 152/427; 301/95
(58) Field of Search ..................... 152/381.3, 381.4, 152/381.5, 415, 427, 428; 301/95, 96, 97, 98

(56) References Cited

U.S. PATENT DOCUMENTS

| | | | |
|---|---|---|---|
| 3,848,652 | * 11/1974 | Hughes | 152/415 |
| 4,258,772 | * 3/1981 | Nakasaki | 152/427 |
| 4,602,665 | * 7/1986 | Sacks | 301/97 |
| 5,988,764 | * 11/1999 | Deetz | 301/95 |
| 6,019,149 | * 2/2000 | Stringer | 301/97 |
| 6,145,937 | * 11/2000 | Chen | 301/95 |

\* cited by examiner

Primary Examiner—S. Joseph Morano
Assistant Examiner—Jason R. Bellinger
(74) Attorney, Agent, or Firm—Rosenberg, Klein & Lee

(57) ABSTRACT

A wheel includes a rim having two sidewalls and a groove is defined between the two sidewalls. A plurality of apertures and a valve receiving aperture are respectively defined through the rim. A seal member is located in the groove and has a hole defined therethrough. The hole is located in alignment with the valve receiving aperture. Two sides of the seal member are located on tops of the two sidewalls of the rim so that when a tire is engaged with the groove, the two sides of the seal member on the tops of the two sidewalls are respectively compressed by the tire.

1 Claim, 3 Drawing Sheets

WHEEL RIM AND A SEAL MEMBER

FIELD OF INVENTION

The present invention relates to a wheel rim and a seal member, and more particularly, to an improved wheel rim that may use or may not use with an inner tube.

BACKGROUND OF THE INVENTION

A conventional wheel that has an inner tube is shown in FIG. 1 and FIG. 2, and generally includes a circular rim 20 having a groove 201 defined in an outside of the rim 20. The wheel rim 20 has two sidewalls between which the groove 201 is defined. A plurality of apertures 202 and a valve receiving hole 203 are radially defined through the rim 20. A separating belt 24 is engaged with the groove 201 and a tire 21 is engaged with the wheel rim 20 by engaging two lips of the tire 21 with the two sidewalls of the wheel rim 20. An inner tube 22 is received between the separating belt 24 and the tire 21. A valve 221 connected to the inner tube 22 extends through a hole 241 in the separating belt 24 and the valve receiving hole 203 in the wheel rim 20. Spokes 23 are engaged with the apertures 203 and are separated from the inner tube 22 by the separating belt 24. Nevertheless, it is a trend to use a tube-less wheel in the market so that many efforts are made to improve the wheel rim designed for the use of inner tube into a wheel rim that can be used on a tubeless tire such as disclosed in Taiwanese published number 354530, 319180 and 239101. The disclosed wheel rims employ a seal member to seal the apertures for the spokes but the leakage problems still exist.

The present invention intends to provide a wheel rim that employs a rubber seal member whose two sides are put on a top of each sidewall and compressed by the tire so that there is a good seal feature between the rubber member and the rim and the tire.

SUMMARY OF THE INVENTION

In accordance with one aspect of the present invention, there is provided a wheel and comprising a rim having two sidewalls and a groove is defined between the two sidewalls. A plurality of apertures and a valve receiving aperture are respectively defined through the rim. A seal member is located in the groove and has a hole defined therethrough. The hole is located in alignment with the valve receiving aperture. Two sides of the seal member are located on two respective tops of the two sidewalls of the rim. A tire is engaged with the groove and compresses the two sides of the seal member on the tops of the two sidewalls respectively.

The object of the present invention is to provide a wheel that has a seal member in a groove of a rim of the wheel, two sides of the seal member is compressed by a tire on two respective tops of two sidewalls of the rim. Therefore, the wheel can be used with an inner tube or without an inner tube.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
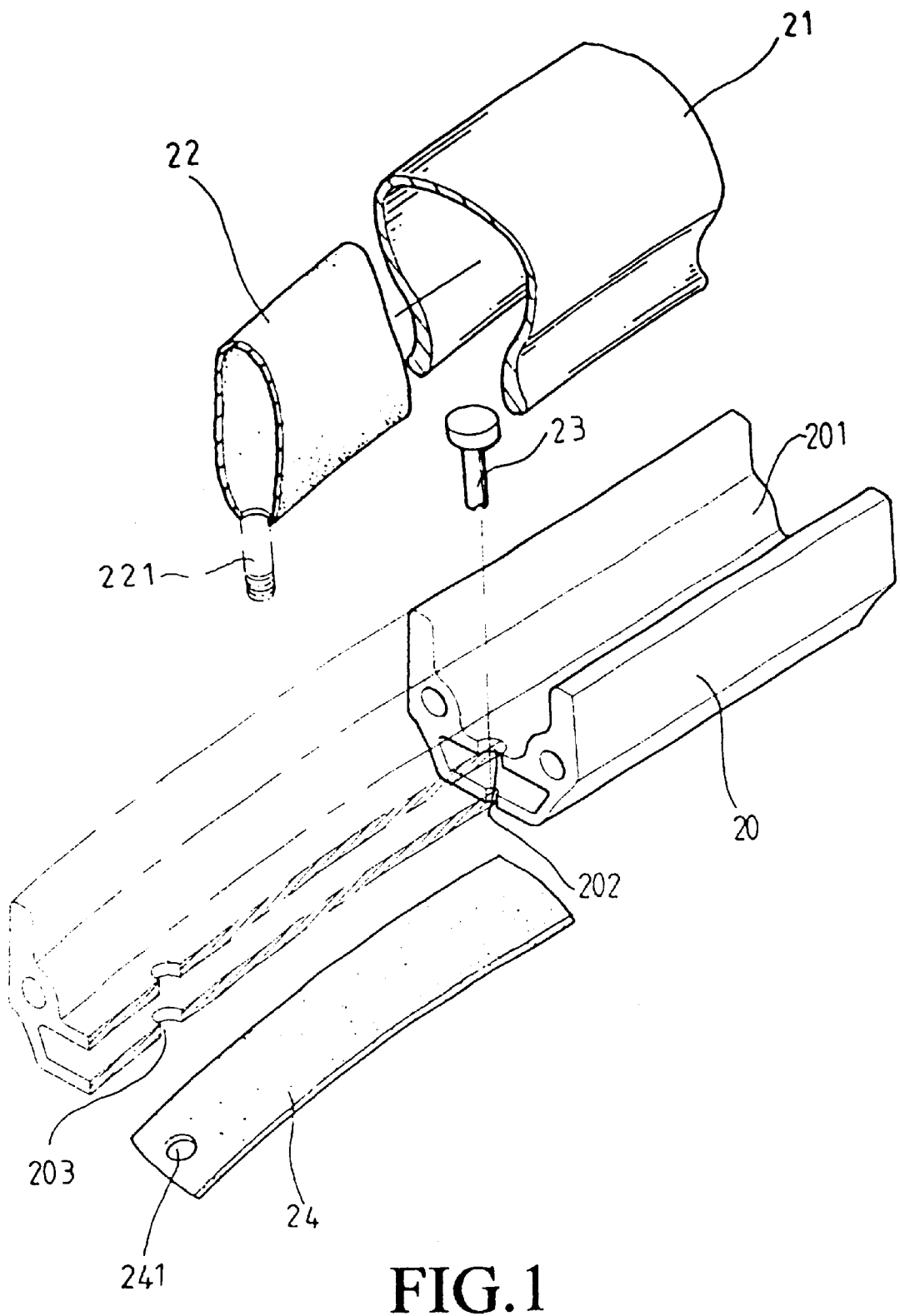
FIG. 1 is an exploded view to show a conventional wheel with an inner tube received in a rim of the conventional wheel.
Figure 4:
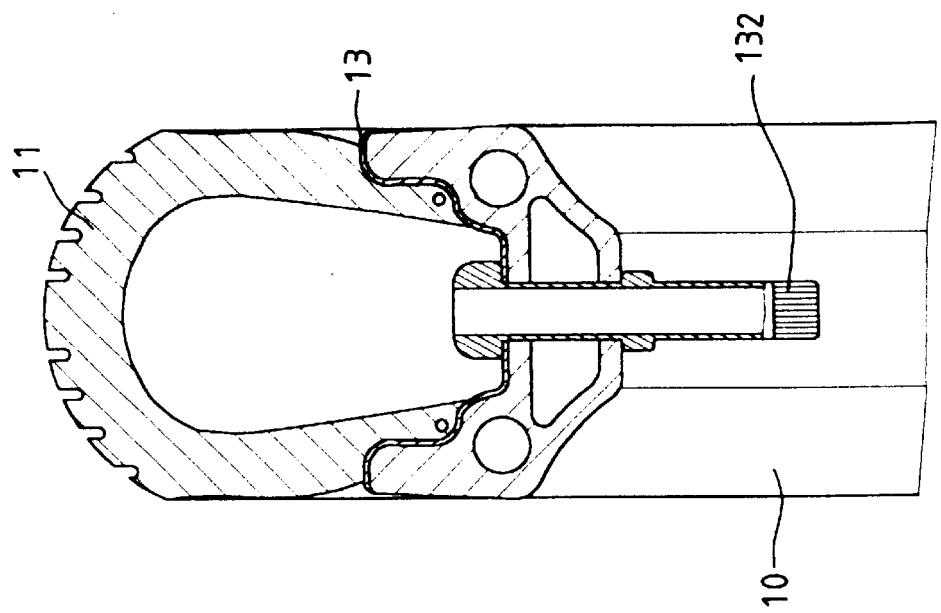
FIG. 4 is a front view, partly in section, of the wheel of the present invention.
Figure 2:
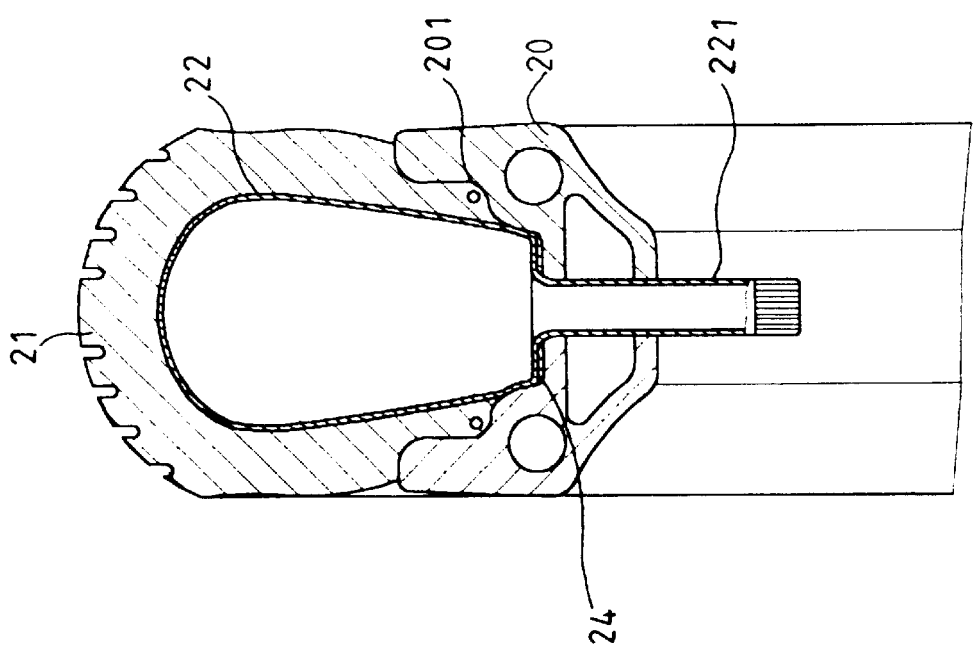
FIG. 2 is a front view, partly in section, of the conventional wheel with an inner tube received therein.
Figure 3:
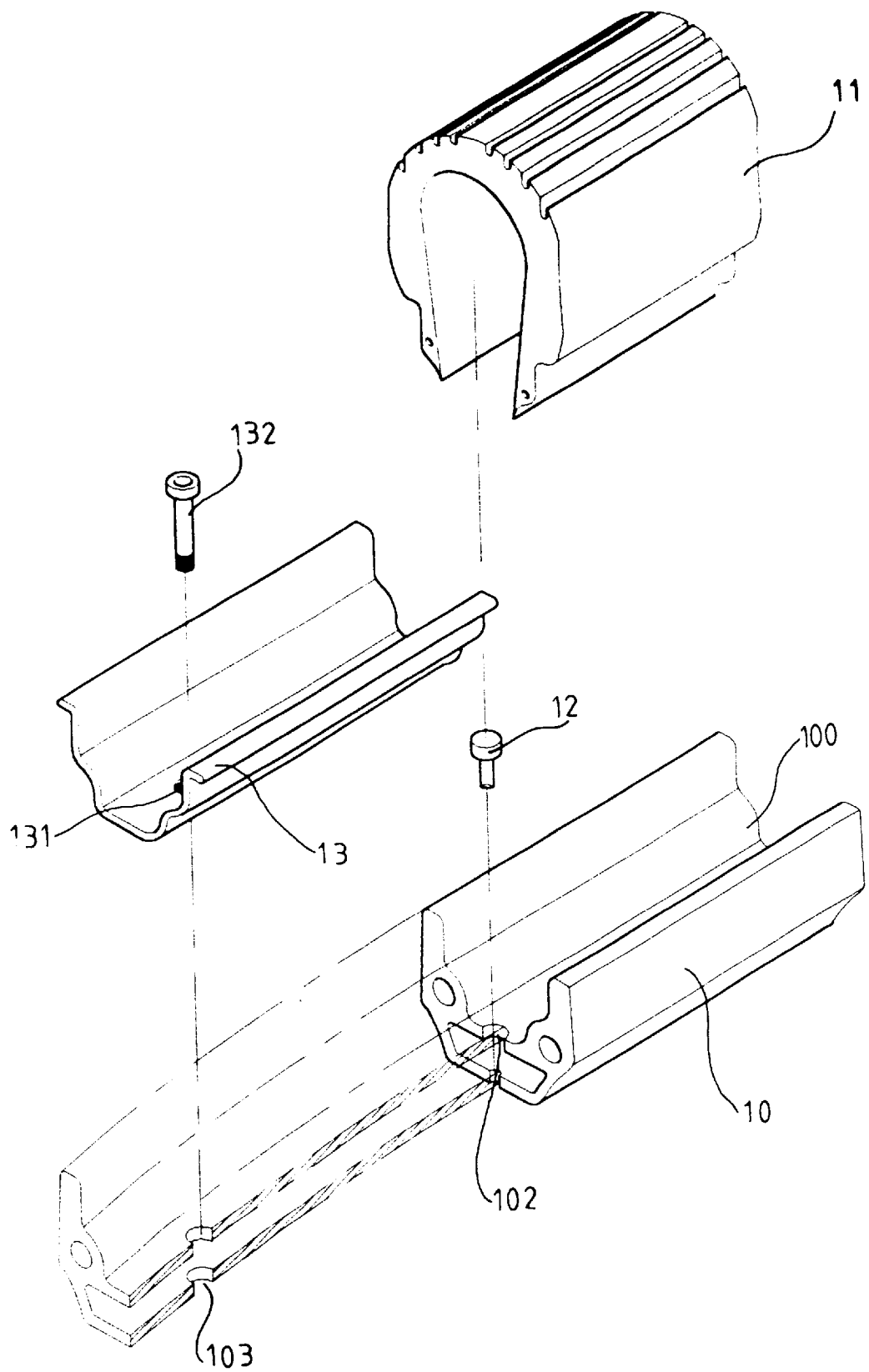
FIG. 3 is an exploded view to show a tubeless wheel of the present invention.

Referring to FIGS. 3 and 4, a wheel structure in accordance with the present invention comprises a rim 10 having two sidewalls and a groove 100 defined between the two sidewalls. A plurality of apertures 102 and a valve receiving aperture 103 are respectively defined through the rim 10 so that spokes 12 can be engaged with the apertures 102. A seal member 13 is located in the groove 100 and has a hole 131 defined therethrough. The hole 131 is located in alignment with the valve receiving aperture 103 so that a valve 132 is engaged with the valve receiving aperture 103 and the hole 131. The seal member 13 is made of flexible material such as rubber and is able to be neatly engaged with the groove 100 of the rim 10. A tire 11 is engaged with the groove 100 and compresses the two sides of the seal member 13 on the tops of the two sidewalls respectively.

It is to be noted that the seal member 13 is wide enough so that the two sides of the seal member 13 can be respectively pressed on the tops of the two sidewalls of the rim 10 by the tire 11. This ensures that when a pressure is maintained between the tire 11 and the rim 10, there will be no leakage. The wheel structure can be used with an inner tube and without an inner tube. The user can change the way of use of the wheel very conveniently.

While we have shown and described various embodiments in accordance with the present invention, it should be clear to those skilled in the art that further embodiments may be made without departing from the scope and spirit of the present invention.

What is claimed is:

1. A wheel, comprising:

a rim, said rim including (a) two sidewalls, each sidewall having a contoured side surface and a top outermost portion thereof, (b) a groove defined between said two sidewalls, said groove having a bottom extending between said side surfaces of said sidewalls of said rim, and (c) a valve receiving aperture formed through said bottom surface of said rim, a seal member superposed on said bottom surface of said groove, and said side surfaces and said top outermost portions of said sidewalls of said rim in continuous contiguous contact therewith, said seal member having a single hole formed therethrough and positioned in alignment with said valve receiving aperture of said rim, a tire, said tire having sides engaged with said sidewalls of said rim at said top outermost portions and said side surfaces thereof through said seal member, and a single valve passing through said single hole formed in said seal member and said valve receiving aperture formed in said rim, said valve having a valve head, said seal member being pressed in contiguous contact with said rim by said sides of said tire and said valve head of said single valve.

* * * * *